Sept. 18, 1951 W. HELLING 2,568,626
CUCKOO DOOR ALARM
Filed Sept. 19, 1949 2 Sheets-Sheet 2
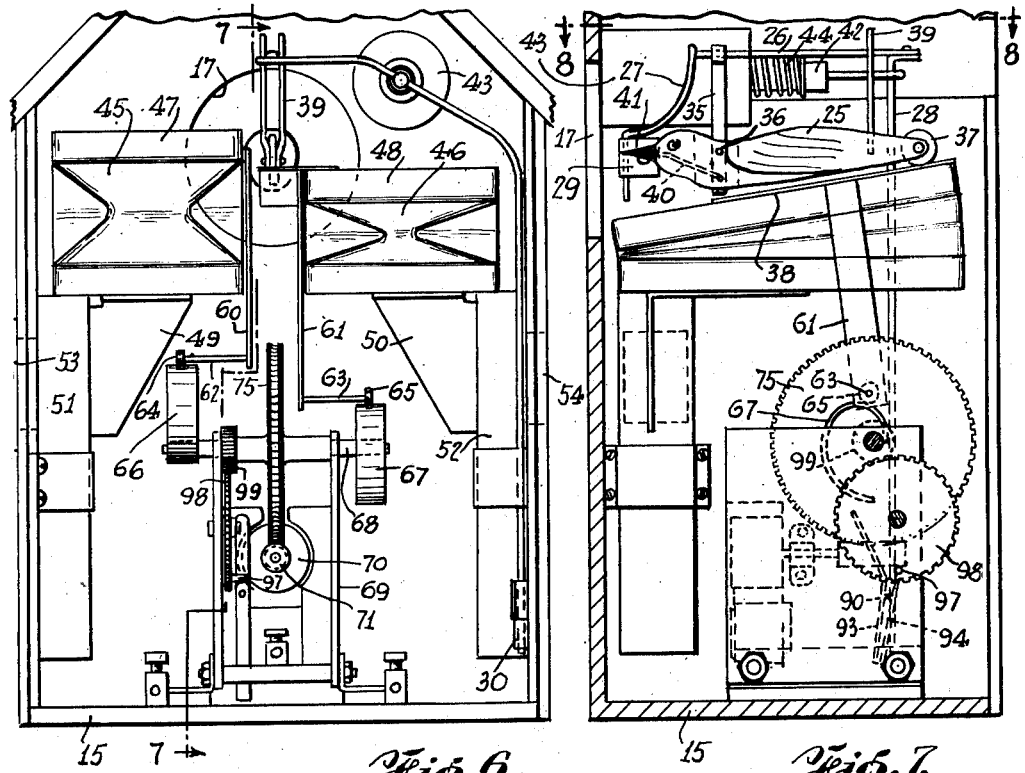
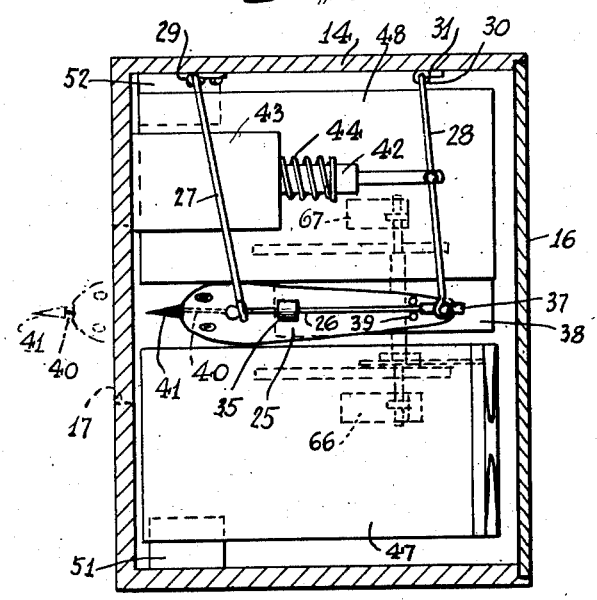
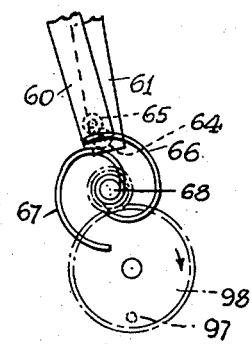
INVENTOR.
WILHELM HELLING.
BY
ATTORNEY.

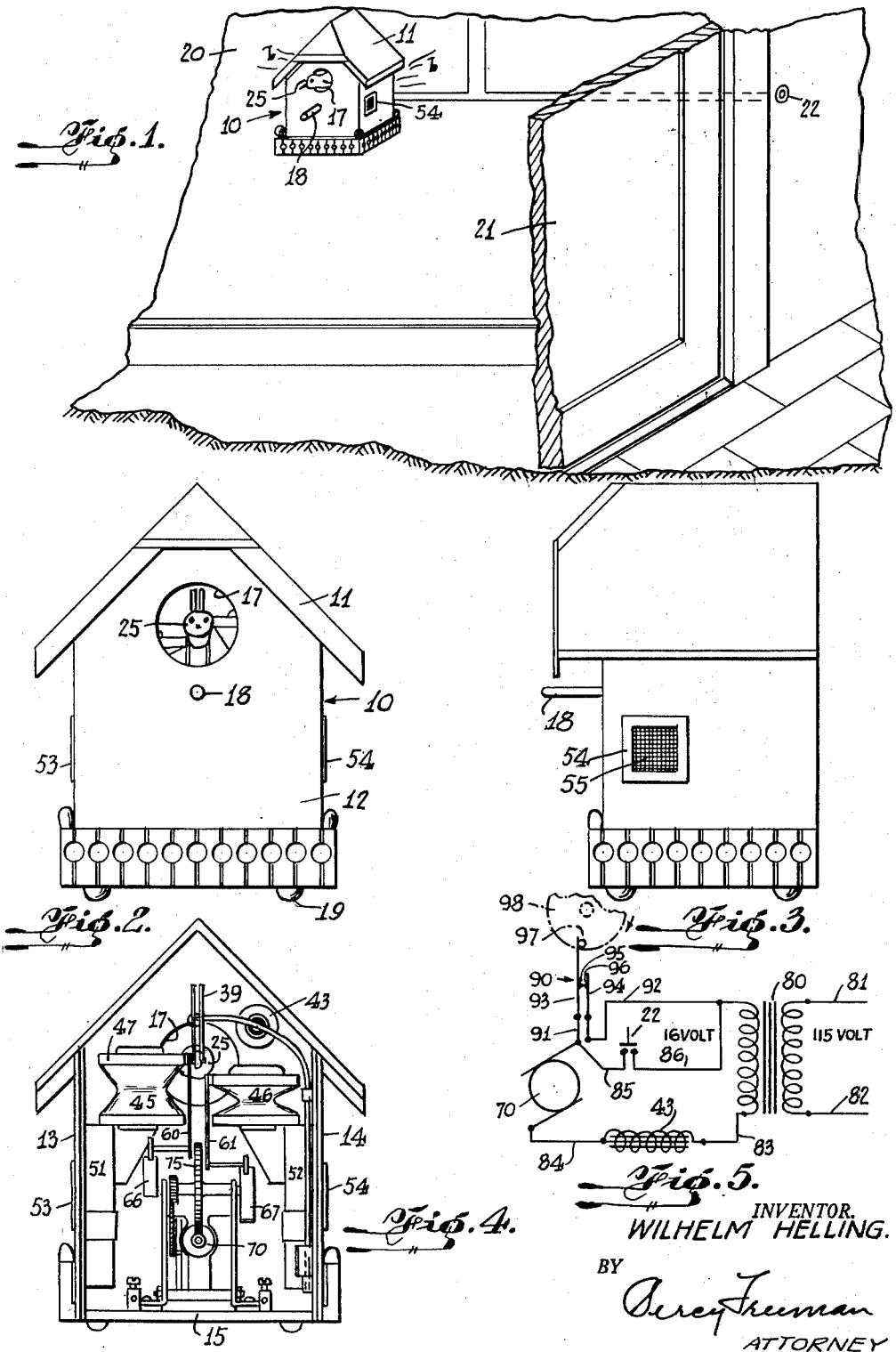

Patented Sept. 18, 1951

2,568,626

UNITED STATES PATENT OFFICE 2,568,626

CUCKOO DOOR ALARM

Wilhelm Helling, Gloversville, N. Y.

Application September 19, 1949, Serial No. 116,589

4 Claims. (Cl. 177—324)

1

This invention relates to a cuckoo signal for doors and the like.

The principal object of this invention is the provision of a signalling device which actuates a cuckoo when energized, and which is designed to take the place of a doorbell, a door buzzer or a door chimes in private homes. This signalling device may be connected to the same electrical circuit which would normally be installed for doorbells, door chimes, and the like. It would be actuated by the same kind of switch which is conventionally used for doorbells and chimes, to wit, a pushbutton type of switch. No special skill or training would be required to actuate this signalling device, since it may be actuated in precisely the same manner as are conventional doorbells and door chimes, and indeed, a stranger actuating the same for the first time would probably be somewhat startled when the sound of a cuckoo is thereby effected instead of the expected sound of a bell or chimes.

The signalling device of the present invention produces two signals, one a visual signal and the other an audible signal. The visible signal comprises a cuckoo which moves forwardly, partly out of its bird house, and the audible signal comprises a sound or a plurality of sounds simulating the call of a cuckoo. The two signals are produced simultaneously when the signalling device is energized. The cuckoo or simulated cuckoo, to be more exact, is movably mounted in the bird house for movement into or partly out of said bird house. A solenoid is connected to the cuckoo and when said solenoid is energized, it pulls the cuckoo to its advanced or signalling position. When the solenoid is de-energized, a spring returns the cuckoo to its retracted or non-signalling position.

The audible signal is produced by a pair of bellows-actuated vibrating elements such as reeds operating in a pair of sound boxes. An electric motor is provided to actuate the bellows through a pair of cams or eccentrics so that when the motor is energized, each bellows is caused to expand and contract to produce the necessary sound effects. More specifically, the motor causes expansion of the bellows and a pair of weights causes said bellows to contract.

The entire signalling device is mounted in a simulated bird house of fine appearance which may advantageously be placed in an exposed location in the home of the user. The entire mechanism is enclosed in the bird house and all that remains open to view is the cuckoo which peers through a circular opening in the front wall of the bird house simulating the circular passageway normally found in bird houses for ingress and egress. The bird house of the present invention may be hung on a wall or other suitable support, or it may be placed upon a shelf or upon a suitable article of furniture.

A preferred form of this invention is shown in the accompanying drawing, in which:

Fig. 1 is a fragmentary perspective view showing the signalling device constituting the present invention mounted on a wall and connected to a pushbutton-controlled electrical circuit.

Fig. 2 is a front view of said signalling device and more especially of the bird house in which it is mounted.

Fig. 3 is a side view thereof.

Fig. 4 is a back view with the back of the birdhouse removed to expose the working parts.

Fig. 5 is an electrical diagram of said signalling device.

Fig. 6 is an enlarged view of the signalling device, looking at it from the back.

Fig. 7 is a sectional view on the line 7—7 of Fig. 6.

Fig. 8 is another sectional view, looking downwardly on the line 8—8 of Fig. 7.

Fig. 9 is a side view of the cams or eccentrics which actuate the bellows.

The signalling device comprising the present invention is housed in a bird house 10. This bird house has the usual roof 11, front wall 12, side walls 13 and 14, respectively, floor 15 and back wall 16. The back wall is removable to expose said signalling device. The front wall has a circular hole 17 formed therein and a perch 18. The bottom wall or floor has a plurality of rubber pads 19 attached thereto so that the bird house may be placed upon an article of furniture without marring its finish. If desired, the bird house may be provided with suitable fastening means for suspending it from the wall 20 of a house. A good location would probably be the room or vestibule behind the front door 21 of the house so that an easily arranged connection may be be provided with the pushbutton 22 which is normally found adjacent the front door. The cuckoo 25 is positioned in the bird house immediately behind its front wall opening 17. When the mechanism hereinafter described is energized, the cuckoo moves forwardly until its head projects outwardly from the bird house, through said front wall opening. When the mechanism is de-energized, the cuckoo is returned to its inner position. The solid lines in Fig. 8 show the retracted position of the cuckoo when the mechanism is de-energized and the dotted lines indicate the advanced or forwardly projecting position of the cuckoo when the mechanism is energized.

The cuckoo is suspended from a longitudinally and horizontally extending rod 26 and said rod is pivotally supported at both ends by means of two brackets 27 and 28, respectively. These brackets are themselves pivotally supported at their lower ends, at 29 and 30, respectively, on side wall 14 of the bird house. The pivots which connect the brackets to longitudinal rod 26 and the pivots which attach said brackets to the wall are all disposed vertically and hence said brackets are enabled to swing either forwardly or backwardly at 29 and 30, and thereby to swing longitudinal rod 26 either forwardly or backwardly, as the case may be. Since the cuckoo hangs from rod 26, the effect of such swinging movement of the two supporting brackets is to project the cuckoo forwardly through opening 17 or to retract said cuckoo backwardly to its inner position in the bird house. A stop 31 which is fastened to supporting bracket 28 engages side wall 14 of the bird house to prevent backward swinging movement of the two supporting brackets beyond a predetermined point.

It has been stated that the cuckoo is connected to longitudinal rod 26. More specifically, a vertically extending bar 35 is looped at its upper end around longitudinal rod 26, and it is engaged intermediate its upper and lower ends by a transversely extending, horizontal pin 36 which is fastened to the body of the bird, adjacent its head. This supports the head of the bird and the forward portion of its body and pin 36 serves as a horizontal pivot, transverse to the pivot of longitudinal rod 26. In other words, vertical bar 35 is enabled to pivot about longitudinal rod 26 and the bird is enabled to pivot about transverse pin 36. The tail of the bird has a wheel 37 journaled therein and said wheel rests upon a bar 38 which will hereinafter more fully be described. It suffices at this point to say that the wheel turns on a transverse axis parallel to pin 36 and the bar 38 extends longitudinally, underneath the bird, and parallel to longitudinal rod 26. It is this wheel resting on bar 38 which supports the tail of the bird. Bar 38 is fixed against forward or backward movement, and it, therefore, serves as a track for wheel 37 when the bird is swung either forwardly or backwardly on supporting brackets 27 and 28. A fork 39 is also provided at the tail end of the bird, and it will be seen in Figs. 6 and 8, that said fork straddles longitudinal rod 26. This fork cooperates with looped bar 35 in enabling the bird to pivot sidewardly on longitudinal rod 26. Since the fork is open, it allows the tail of the bird to move upwardly or downwardly, relative to longitudinal rod 26, as the bird pivots on its transverse pin 36. The means by which the supporting brackets are caused to swing forwardly and backwardly and the means by which the cuckoo is caused to pivot upwardly and downwardly about its said transverse pin 36, will shortly be described.

Pivotally attached at one end, to the lower end of vertical bar 35, is a forwardly projecting wire 40. At its opposite or forward end, said wire is provided with a bill 41 which projects through an opening in the head of the cuckoo. Said opening corresponds, of course, to the normal location of the bird's bill. Wire 40 and bill 41 are free to move relative to the bird, and hence when the bird is caused to pivot about the transverse axis represented by pin 36, relative movement between the bill and the head of the bird will take place. In consequence, an extremely realistic effect is produced which is coordinated and sound-producing mechanism produces.

The plunger 42 of a solenoid 43 is attached to supporting bracket 28. When the solenoid is energized, its plunger retracts and draws said supporting bracket forwardly, thereby moving longitudinal rod 26 forwardly and by the same token moving the cuckoo forwardly to its forwardly or outwardly projecting position. A compression spring 44 resists retraction of the plunger when the solenoid is energized and when the solenoid is de-energized, the spring acts upon the plunger to project it backwardly. The cuckoo is thereby returned to its retracted or non-signalling position.

The cuckoo call sounding mechanism includes a pair of bellows 45 and 46, respectively, which have weights 47 and 48 mounted atop them to urge them to contracted position. The bellows are connected by means of ducts 49 and 50, respectively, to sound boxes 51 and 52. These sound boxes are provided with suitable vibrating or sound-producing means, such as reeds to produce a sound or sounds simulating the call of a cuckoo. These sound boxes are open to the outside of the bird house through windows 53 and 54, which are provided in the side walls of said bird house. Screening 55 may be used to cover said windows in order to provide a pleasing effect.

The means whereby the bellows are expanded against the action of weights 47 and 48, is best shown in Figs. 6 and 9. It will there be seen that the weighted ends of the two bellows are connected by means of thrust rods 60 and 61, respectively, to a pair of cross bars 62 and 63, respectively, which have wheels 64 and 65, mounted on them. These wheels serve as cam followers with respect to interrupted spiral cams or eccentrics 66 and 67, which are fixedly mounted on a common shaft 68. Shaft 68 is supported on a frame 69, and it extends transversely of the bird house, on a line parallel to the axis of pin 36. Also mounted on frame 69 is an electric motor 70 which has a worm 71 affixed to its shaft. This worm engages a worm wheel which is fixedly on shaft 68 so that when the motor is in operation its worm causes the worm wheel and the shaft on which said worm wheel is mounted to rotate. Since cams 66 and 67 are fixedly mounted on said shaft 68, they too are caused to rotate with said shaft into and out of engagement with cam followers 64 and 65. These cams may be made to occupy staggered or opposite angular positions about said shaft 68 so that when one moves into engagement with one of said cam followers, the other moves out of engagement with the other cam follower.

The effect of such interaction between the cams and their respective followers is to cause the bellows to expand in alternate relationship. As each cam engages its follower, the bellows to which said follower is connected is allowed to fall or collapse to contracted position in response to the action of the weight which is mounted thereon. Since the bellows are connected to the sound boxes, this sequence of expansion and contraction produces the call of the cuckoo bird.

It has been noted that wheel 37 which is connected to the tail of the bird, rests upon a bar 38. It will be seen in Fig. 6 and Fig. 7 that said bar is supported by bellows 46, and more particularly by the weight 48 which is mounted on said bellows. When bellows 46 is caused to expand, bar 38 is moved upwardly to an elevated position. It will be seen in Fig. 7 that the bellows does not expand uniformly on all sides. Instead, it expands primarily at the back and its front portion remains contracted. In other words, the bellows is so fashioned that it tends to expand at an angle or arcuately about a horizontal line drawn transversely thereof, through its front end. It will become apparent, therefore, that bar 38 will be raised to a sloping position when the bellows expands, the lower end of the bar being its front end and the upper end thereof being its back end. Two results flow from this action: the cuckoo is caused to pivot about its cross pin 36, and forward movement of said cuckoo responsive to the action of the solenoid is facilitated. As the bellows contracts, bar 38 will fall and the cuckoo will pivot downwardly, that is, in clockwise direction as viewed in Fig. 7. As the bellows expands, the cuckoo will pivot upwardly, that is, in counterclockwise direction as viewed in said Fig. 7. This pivotal movement of the cuckoo in both directions will cause relative movement between the head of the bird and its bill 41 as has above been described.

The cuckoo is caused to engage in three different movements: when the solenoid is energized, the cuckoo is caused to project forwardly through hole 17 in the front wall of the bird house. When the motor is energized, the cuckoo will be caused to pivot in both directions about pivot 36, and relative longitudinal movement between the bill of the bird and its head will also be caused. Since the latter two movements of the bird are effected by the action of one of the bellows, these movements will be synchronized with the sound producing activities of the sound boxes. A realistic performance of a bobbing head, a moving bill and an alternately sounded cuckoo call will thereby be produced.

The electrical diagram of the apparatus above described is shown in Fig. 5. Household alternating current of, say 115 volts, is brought to a transformer 80 over conductors 81 and 82. The voltage is stepped down to approximately 16 volts and a conductor 83 carries said reduced current to solenoid 43. Another conductor 84 connects said solenoid in series with motor 70 and a conductor 85 connects said motor to pushbutton 22. Another conductor 86 connects said pushbutton to the opposite side of the transformer to complete the circuit. When the pushbutton is pressed, the circuit is closed and both the motor and the solenoid are energized. If this were the entire electrical means for operating the signalling device above described, it would be necessary to keep one's finger on the pushbutton as long as actuation of the signalling device would be required. An additional switch 90 has accordingly been provided to keep the circuit closed for a given period of time, irrespective of how long the pushbutton is engaged by the operator's finger. More specifically, switch 90 provides a given cycle which energizes the solenoid and motor a given period of time, say five seconds, more or less. If the pushbutton is engaged for a period of only one second or possibly two seconds, the mechanism will operate for a full cycle period of five seconds. Should the pushbutton be engaged by the operator's finger for a period of six seconds, the mechanism will function through two cycle periods for a total of ten seconds.

Switch 90 is a normally closed switch. A conductor 91 connects it to the motor and solenoid and one side of the transformer and a second conductor 92 connects it to the opposite side of the transformer. When switch 90 is closed both the motor and the solenoid are energized, irrespective of whether pushbutton switch 22 is open or closed. Switch 90 comprises a pair of arms 93 and 94, respectively, which are provided with contacts 95 and 96, respectively. These arms, or at least one of them, may be made of spring metal to urge them into normal engagement with each other through their respective contacts 95 and 96. A pin 97 mounted on a gear wheel 98 driven by a pinion 99 on shaft 68 is positioned to move into and out of engagement with switch arm 93 when said gear wheel is caused to rotate. When pin 97 engages arm 93, it moves said arm and more particularly its contact 95 out of engagement with contact 96 on arm 94. This would open the circuit which said switch 90 controls.

The manner in which the switch mechanism last above described operates, is as follows: Pushbutton 22 is pressed to energize the motor and the solenoid through the circuit first above described. Shaft 68, pinion 99 and gear wheel 98 are thereby caused to rotate and pin 97 is thereby moved out of engagement with arm 93. Said arm is now free to move toward arm 94 to close switch 90. The second circuit above described is now closed and the pushbutton switch may be opened without de-energizing either the motor or the solenoid. The motor continues to operate and pin 97 is thereby once again brought into engagement with switch arm 93, thereby opening switch 90. The motor and solenoid are automatically de-energized and pin 97 remains in engagement with switch arm 93 to prevent switch 90 from closing.

The foregoing is descriptive of a preferred form of this invention, and it will be understood that said form may be modified and other forms may be provided within the broad scope and spirit of the invention.

Having thus described my invention, what I claim as new and desire to secure by Letters Patent, is:

1. A cuckoo signal for doors and the like, comprising a bird house, a cuckoo movably mounted in said bird house for forward movement to exposed signalling position and for backward movement to concealed non-signalling position, a solenoid connected to said cuckoo for moving the cuckoo forwardly to signalling position when the solenoid is energized, a spring connected to the cuckoo for retracting the cuckoo to non-signalling position when the solenoid is de-energized, a sound-producing mechanism for producing a plural note sound representative of the call of the cuckoo bird when said cuckoo is moved forwardly to signalling position, a plurality of bellows for actuating said sound-producing mechanism, a cam rotatably mounted adjacent each bellows for actuating said bellows, said cams being axially aligned, and a motor to rotate said cams, each said bellows being expandable in an upward direction in response to the cam action thereon and being provided with weights for contracting them in a downward direction when they are freed from the cam action, one of said bellows being provided with a support on which rests the tail of the cuckoo, said cuckoo being pivotally mounted on a transversal extending pivot for pivotal movement thereof when said bellows expands and contracts.

2. A cuckoo signal in accordance with claim 1, wherein the tail of the cuckoo is provided with a wheel mounted on a transversely disposed axle, said wheel being situated to rest upon the cuckoo support on the bellows.

3. A cuckoo signal in accordance with claim 1, wherein the bellows which has the cuckoo support thereon is angularly expandable to give the cuckoo support a forward and downward slope when said bellows is expanded.

4. A cuckoo signal in accordance with claim 1, wherein the cuckoo is provided with a bill which is freely movable relative to the head of the cuckoo, said bill being mounted on a support which is pivotally mounted on a transversely extending pivot other than the pivot on which the cuckoo itself is mounted, whereby relative movement between the bill and the head of the cuckoo takes place when the cuckoo is pivoted on its said transverse pivot.

WILHELM HELLING.

REFERENCES CITED

The following references are of record in the file of this patent:

UNITED STATES PATENTS

| Number | Name | Date |
| --- | --- | --- |
| 1,041,177 | Schmidt | Oct. 15, 1912 |
| 1,121,124 | Northrup | Dec. 15, 1914 |
| 1,194,018 | Hartner | Aug. 8, 1916 |
| 1,784,961 | Enneking | Dec. 16, 1930 |
| 2,375,281 | Cameron | May 8, 1942 |
| 2,504,811 | Davis et al. | Apr. 18, 1950 |